United States Patent Office 3,277,206
Patented Oct. 4, 1966

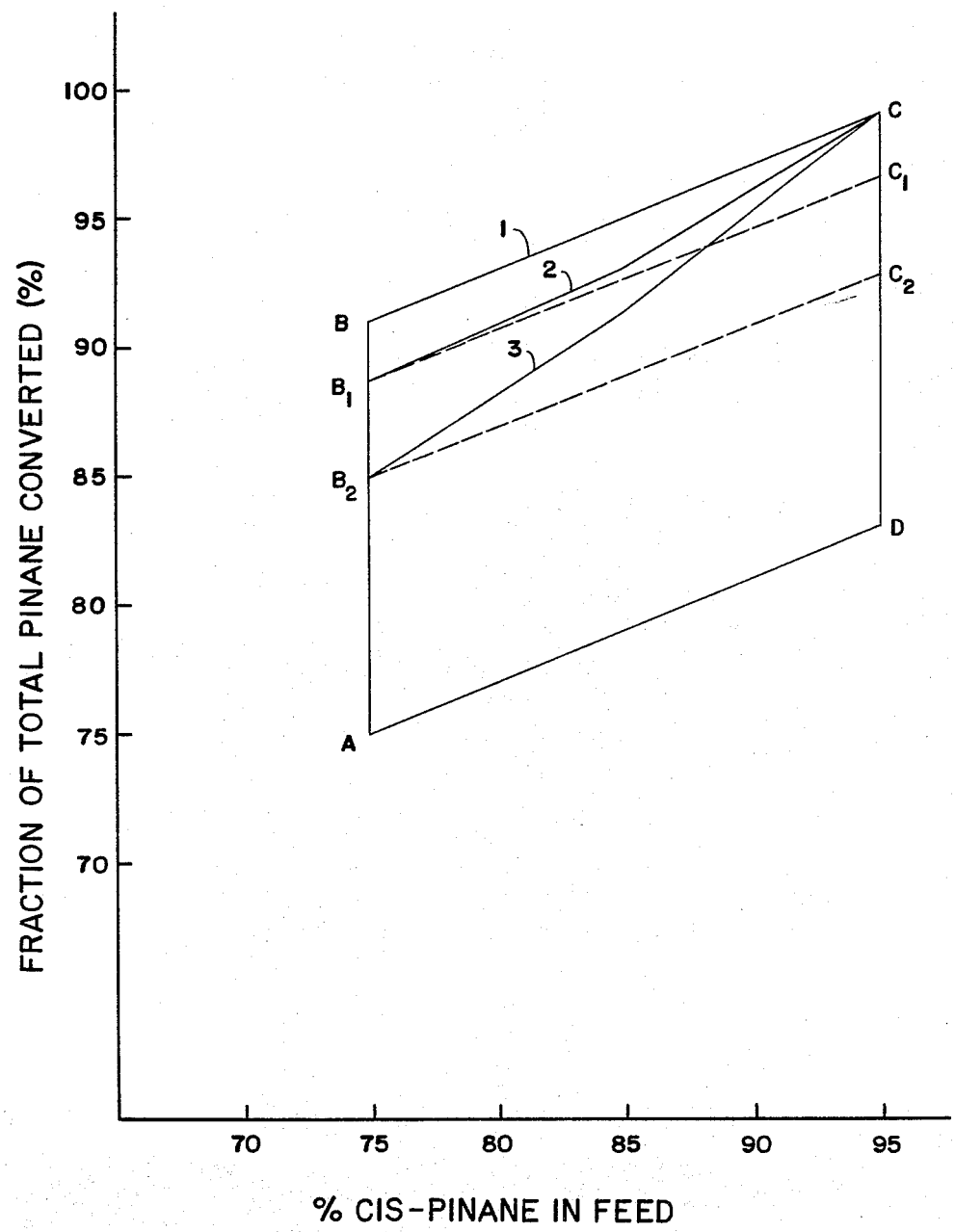

3,277,206
PREPARATION OF 2,6-DIMETHYL-2,7-OCTADIENE
Joseph P. Bain, 2255 Holly Oaks River Road, Jacksonville, Fla.
Filed July 14, 1965, Ser. No. 471,989
6 Claims. (Cl. 260—680)

This invention is a continuation-in-part of U.S. patent application S.N. 165,294 filed January 10, 1962, now abandoned, which file and disclosure are incorporated herein by reference.

The present invention relates to an improved process for the production of 2,6-dimethyl-2,7-octadiene, and more particularly to an improved process for the production of optically active 2,6-dimethyl-2,7-octadiene from pinane. Operation in accordance with the invention principles: makes it possible to prepare from pinane optically active 2,6-dimethyl-2,7-octadiene having a greater optical activity than heretofore has been expected or realized; and minimizes the pyrolytic production of reaction products other than 2,6-dimethyl-2,7-octadiene, thereby conserving pinane and increasing overall octadiene yield.

A process in which pinane is pyrolyzed to produce 2,6-dimethyl-2,7-octadiene has been described in U.S. Patent 2,388,084 issued to Rummelsburg. The pyrolysis of a dextro-rotatory pinane has been disclosed by Pines et al. in J.A.C.S. 76; 4412 (1954). Levo-rotatory 2,6-dimethyl-2,7-octadiene of high optical activity is a valuable compound useful as an intermediate in the synthesis of l-methol. Dextro-rotatory 2,6-dimethyl-2,7-octadiene is useful in the preparation of rose oxide.

It has presently been observed that the pyrolysis (sometimes hereinafter referred to as "thermal isomerization") of optically active pinane to produce optically active 2,6-dimethyl-2,7-octadiene often results in a significant loss of optical activity of the 2,6-dimethyl-2,7-octadiene compared with the optical activity of the starting pinane. The reason for this loss of activity is due, inter alia, to the formation of optically inactive side reaction products and mixed stereo-isomers of the octadiene.

The present invention provides an improved process by which it is possible to produce optically active 2,6-dimethyl-2,7-octadiene having an optical purity corresponding to and substantially the same as the optical purity of the starting pinane feed. The improved process of this invention is further economical in that it tends to minimize the formation of undesirable side reaction products which usually form simultaneously with 2,6-dimethyl-2,7-octadiene.

The term "optical purity" as used herein is intended to mean and to refer to the percentage excess of one enantiomorphic isomer to the total enantiomorphic isomeric mixture. Thus, for example, a pinane feed having 90% levo-rotatory optical purity would contain 95% of the levo-rotatory pinane enantiomorph and 5% of the dextro-rotatory pinane entantiomorph. Ten percent of the total mixture would be racemic in that it would contain 5% of the levo-rotatory and 5% of the dextro-rotatory pinane enantiomorph.

The terms "optical activity" and "optically active" as used herein are intended to mean and to refer to mixtures of stereo-isomers which exhibit optical rotation. When used in connection with pinane feeds they refer to mixtures containing l-cis, l-trans, d-cis and d-trans-pinanes which exhibit optical rotation. When used relative to 2,6-dimethyl-2,7-octadiene they refer to mixtures of optical (e.g., d- and l-) isomers in which one optical isomer predominates over the other.

The term "racemization" as used herein is intended to mean and to refer to changes in optical purity by the formation of an enantiomorph of opposite optical sign to the predominant enantiomorph initially present. The term "epimerization" as used herein is intended to mean and to refer to an isomerization reaction in which the structural configuration of an asymmetric center in an optically active isomer is partially converted to a configuration of opposite sign to that of the initial configuration.

The invention is based in part on the discovery that pinane feeds prepared by the hydrogenation of pinene contain a mixture of geometric isomers of pinane (e.g., cis-pinane and trans-pinane), and that the relative proportions of these geometric isomers in the pinane feed can be controlled by the selection of certain herinafter defined catalysts employed in the preparation of the pinane feed.

The invention is also based in part on the discovery that, during the pyrolysis of an optically active mixture containing cis- and trans-pinanes of either optical sign, the cis-pinane isomers thermally isomerize to 2,6-dimethyl-2,7-octadiene at a faster rate than the optically active trans-pinane isomers.

The invention is further based in part on the discovery that optically active trans-pinanes unexpectedly thermally isomerize to form optically active 2,6-dimethyl-2,7-octadiene of an optical sign opposite to the optical sign of the starting optically active trans-pinane. However, optically active cis-pinanes thermally isomerize to form optically active 2,6-dimethyl-2,7-otcadiene of the same optical sign as that of the starting cis-pinane.

In invention utilizes these discoveries in the practical production of 2,6-dimethyl-2,7-octadiene by thermal isomerization of a pinane mixture in a pyrolysis zone at a temperature from about 450° C. to about 650° C. The improvement in process, for making an optically active 2,6-dimethyl-2,7-octadiene isomerizate, having corresponding optical activity substantially equal to the optical activity of the original pinane mixture, comprises: (1) passing into a pyrolysis zone an optically active pinane feed in which the optical activity is due to a mixture of cis- and trans-pinane isomers of the same optical rotation and further in which the proportion of cis-pinane to trans-pinane is between about 75:25 and 95:5; and (2) arresting pyrolysis of said feed when the fraction of the original pinane pyrolyzed reaches a value within polygon ABCD of the drawing substantially coordinate with the original cis-pinane content of said feed.

The resulting mixed stereo-isomers (e.g., optically active 2,6-dimethyl-2,7-octadiene) are recoverable from the isomerizate by fractional distillation or other conventional fractionating procedures. These mixed stereo-isomers have an optical activity substantially equal to the optical activity of the starting pinane and this is meant to include those instances where said mixed isomers can have a slightly higher optical activity as well.

Line BC in the accompanying drawing relates a cis-pinane content of pinane feed, in the range of from about 75 to 95% cis-pinane, to the fraction of total pinane converted by pyrolysis, for obtaining approximately the maximum optical activity in the resulting pyrolyzate at pyrolysis temperatures between about 400° to 475° C. Line $B_1C$ corresponds to BC except that the pyrolysis temperatures are between 475° and 550° C. Line $B_2C$ corresponds to BC except that the pyrolysis temperature is between about 550° and 650° C.

Polygon ABCD represents a broadly useful operating range for coordinating the cis content of a particular feed with the cessation of its pyrolysis, thereby obtaining 2,6-dimethyl-2,7-octadiene of desirably high optical activity while concurrently minimizing the formation of reaction products other than said octadiene in the temperature range of 400° to about 650° C.

Polygon AB₁C₁D represents a similar but more advantageous operational range for temperatures between about 475° and 550° C.

Polygon AB₂C₂D represents a similar operational range which is more advantageous for temperatures in the range of from about 550° to about 650° C.

The pyrolysis of the pinane feed to 2,6-dimethyl-2,7-octadiene is carried out under vapor phase conditions using conventional pyrolysis techniques and equipment. The particular temperatures employed within the above-defined ranges are not critical and can be varied considerably. However, the time within which the pinane feed is subjected to elevated temperatures will affect the degree of pyrolysis and also the amount of secondary reaction products formed in the pyrolyzate. Thus the higher the temperature the faster will be the rate of conversion of pinane to 2,6-dimethyl-2,7-octadiene and, also, the rate at which undesirable side reaction products are formed. Although temperautres within the range of 400° to 700° C. can be employed, temperatures within the range of 450° C. to 650° C. are more advantageous. At temperatures between 400° and 450° C. the reaction time is unduly prolonged, and at temperatures above 650° C. the rate of formation of undesirable side reaction products is disadvantageously large and some difficulties in arresting the pyrolysis at the desired time is often experienced. Temperatures in the range of 500° to 625° C. are generally useful, and temperatures between 550° to about 600° C. are particularly preferred because within this range the rate of pinane conversion is rapid enough to insure good yields of 2,6-dimethyl-2,7-octadiene of optimal optical activity. Because the pyrolysis reaction is arrested prior to complete conversion, the residence time of the feed in the pyrolysis zone is usually in the order of seconds and the formation of undesirable side reaction products is held to a minimum.

The pyrolysis of the pinane feed is suitably arrested by lowering the temperature of the pinane feed prior to complete pyrolysis, either by quenching the pyrolyzate while it is in the pyrolysis zone, prior to withdrawing it therefrom, or withdrawing the pyrolyzate from the pyrolysis zone at the degree of conversion desired. Withdrawal of the pyrolyzate prior to complete conversion is preferred for economic reasons and can be readily accomplished by regulating the temperature of the pyrolysis zone and the rate at which the pinane feed is passed through the pyrolysis zone.

The particular time at which the pyrolysis of the pinane feed is arrested will depend upon the size of the pyrolysis zone and the rate (e.g. amount) and temperature at which the pinane feed is passed therethrough. The time of arrest or cessation of the pyrolysis reaction is readily predetermined by passing several pinane feeds through a pyrolysis zone at varying times, rates and temperatures and analyzing the resulting pyrolyzates by well-known analytical methods such as, for example, by vapor phase chromatography, fractional distillation, and the like. From the foregoing it is evident that a particular pyrolysis zone can be readily calibrated and a partially converted pinane feed (e.g. pyrolyzate) can be readily obtained at the degree of partial conversion desired.

As noted hereinbefore, the pinane feed employed is an optically active pinane feed in which the proportion of cis-pinane to trans-pinane is from 75:25 to 95:5. Although lesser amounts of cis-pinane may be employed, such procedure is not generally economically advantageous. On the other hand, pinane feeds containing more than 95% cis-pinane are costly and difficult to obtain.

The best source of pinane is from the hydrogenation of pinene and, as will be hereinafter evident, in order to produce an optically active 2,6-dimethyl-2,7-octadiene, a pinene having a high degree of optical purity is desired. Turpentine is a readily available commercial source of pinene and, depending upon the source of the turpentine, commercial quantities having a high degree of optical purity (e.g., 95% or greater) can be easily obtained.

It has presently been found that the hydrogenation of optically active pinene to produce pinane results in an optically active pinane feed containing a mixture of cis-pinane and trans-pinane having the same optical sign as the starting pinene, and that the cis-pinane:trans-pinane ratio can be altered by the particular catalyst employed. Thus, for example, using lump Raney nickel to hydrogenate 99% levo-rotatory α or β pinene (from American turpentine) results in a mixture containing from 83–85% levo-rotatory cis-pinane and from 17–15% levo-rotatory trans-pinane. A 25% reduced nickel catalyst employed to hydrogenate pinene from the same source results in a pinane feed containing 95% levo-rotatory cis-pinane and 5% levo-rotatory trans-pinane. When it is desired to produce optically active trans-pinane rather than cis-pinane, from optically active α or β pinene, copper chromite and/or palladium catalysts yield pinane feed mixtures rich in optically active trans-pinane having the optical sign of the pinene. The reactions starting from levo-rotatory α- or levo-rotatory β-pinene through pinane and levo-rotatory 2,6-dimethyl-2,7-octadiene to produce l-menthol are illustrated by the following equations:

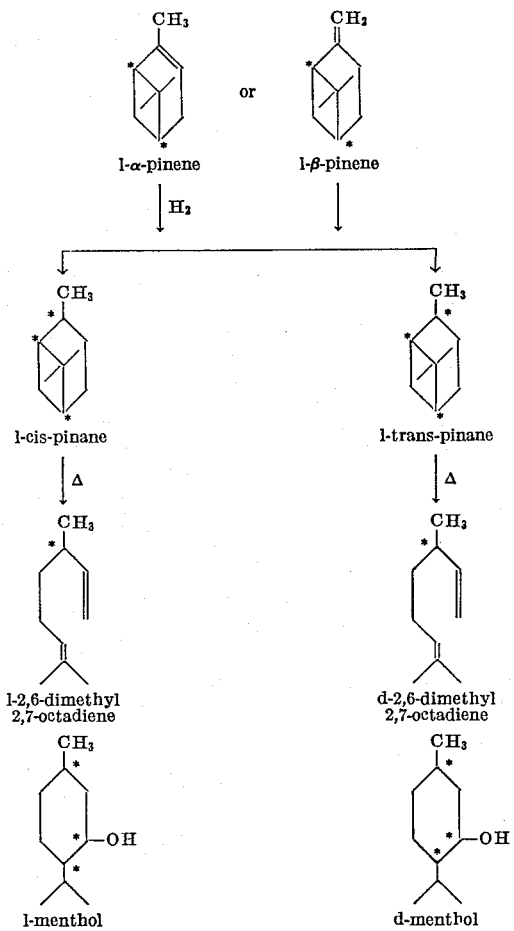

*The asterisks indicate asymmetric centers.

As previously noted, it has presently been discovered that cis-pinane pyrolyzes at a faster rate (and therefore at a lower temperature) than trans-pinane. Thus, when a pinane feed containing from about 75 to about 95% cis- and 5 to 25% trans-pinane is introduced into a pyrolysis zone the cis-pinane will disappear at a faster rate than the trans-pinane. Since optically active cis-pinane is converted to optically active 2,6-dimethyl-2,7-octadiene of similar optical sign, it is evident that the faster rate of conversion of the cis-pinane will result in a greater quantity of optically active 2,6-dimethyl-2,7- octadiene corresponding to the optical activity of the cis-pinane in the initially formed isomerizate. Also, the formation of optically active 2,6-dimethyl-2,7-octadiene of opposite optical sign (due to the pyrolysis of trans-pinane) will be minimal. However, as pyrolysis proceeds, a point will be reached where, despite the greater rate of pyrolysis per unit of the cis-pinane, the rate of formation of the pyrolysis products of the cis-pinane will equal the rate of pyrolysis of the trans-pinane. Since, as above noted, trans-pinane is converted to 2,6-dimethyl-2,7-octadiene of opposite optical sign, some racemization of the 2,6-dimethyl-2,7-octadiene will occur in the late stages of the pyrolysis and a portion of the optical activity of the 2,6-dimethyl-2,7-octadiene will be lost.

The point where the rate of formation of the pyrolysis products of the cis-pinane equals the rate of formation of the pyrolysis products of the trans-pinane (for preferred cis-pinane concentrations) is the point where the pyrolyzate will contain the maximum amount of optically pure 2,6-dimethyl-2,7-octadiene.

It will be apparent to those skilled in the art that the more rapid pyrolysis of the optically active cis-pinane will result in an initial increase in the optical activity of the 2,6-dimethyl-2,7-octadiene because more optically active cis-pinane is being converted to octadiene of similar optical sign and less optically active trans-pinane is being converted to an octadiene of opposite optical sign. Arresting the pyrolysis reaction at or prior to the point where the rates of formation of the pyrolysis products of cis- and trans-pinane products are equal will result in a pyrolyzate containing 2,6-dimethyl-2,7-octadiene which may have substantially the same optical sign and purity as the optical sign and purity of the pinane initially present in the pinane feed; provided, however, that significant optical activity is not lost through excessive formation of optically inactive side reaction products which sometimes form concurrently with the octadiene during the pyrolysis.

It is for this reason that line $B_1C_1$ defines useful points of arrest of the pyrolysis reaction and that line $B_2C_2$ and points below the line but within the area of $AB_2C_2D$ represent the preferred area in which the pyrolysis reaction is arrested. By arresting the reaction within the last-mentioned area 2,6-dimethyl-2,7-octadiene in good yield and having optimum optical activity is obtained while minimal amounts of undesirable side reaction products are formed.

It will also be apparent that the fraction of the total pinane converted at the time the pyrolysis is arrested will vary to some extent with the concentration of the cis-pinane initially present in the pinane feed. For example, a pinane feed wherein 95% of the pinane is present as cis-pinane can be pyrolyzed to a point where about 97½% of the pinane initially present in the pinane feed is converted to an isomerizate containing 2,6-dimethyl-2,7-octadiene. However, when only 75% of the initial pinane in the pinane feed is composed of cis-pinane, the reaction can be arrested at a time when 95% or less of the original pinane is pyrolyzed to prevent the formation of unduly large quantities of side reaction products in the feed.

To further illustrate the advantages of the present invention, it is possible to obtain levo-rotatory 2,6-dimethyl-2,7-octadiene of 100% levo-rotatory optical purity by pyrolyzing a pinane feed consisting substantially of a mixture of 90% pure levo-rotatory cis-pinane and 10% pure dextro-rotatory trans-pinane and stopping the pyrolysis at at point within ABCD of the drawing corresponding to the amount of cis-pinane present in the feed. Conversely, it is possible to obtain 100% optically pure dextrotatory 2,6-dimethyl-2,7-octadiene by pyrolyzing a pinane feed consisting substantially of 90% pure dextro-rotatory cis-pinane and 10% pure levo-rotatory trans-pinane and stopping the reaction as defined hereinbefore.

The following specific examples are intended to illustrate the invention but not to limit the scope thereof, parts and percentages being by weight unless otherwise specified.

EXAMPLE 1

A β-pinene containing 95% 1-β-pinene was hydrogenated at 120° C. and at a pressure of 400 p.s.i.g. using 1% of a reduced nickel catalyst added as a 25% dispersion in tallow and known commerically as a "Rufert" catalyst, to provide a pinane feed containing 95% levo-rotatory cis-pinane and 5% levo-rotatory trans-pinane. This mixture served as a concentrate for isolating, by fractional distillation, the higher boiling cis-isomer which was obtained at 99+% purity and had the following physical characteristics:

| | |
|---|---|
| $N_D^{20}$ | 1.4628 |
| $N_D^{25}$ | 1.4609 |
| $\alpha_D^{25}$ (10 cm.) | −19.86 |
| $d_4^{25}$ | .8547 |
| $d_4^{55}$ | .8311 |
| $d_4^{15}$ | .8627 |

The material so prepared was set aside for use in the pyrolysis described in Example 6.

When 95% d-β-pinene is hydrogenated under the same temperature and pressure conditions employed in Example 1 and using the Rufert catalyst employed therein, one obtains a pinane feed containing 95% dextro-rotatory cis-pinane and 5% dextro-rotatory trans-pinane.

EXAMPLE 2

Ninety-nine percent β-pinene containing 95% levo-rotatory β-pinene was hydrogenated at 90° C. and at a pressure of 60 p.s.i.g. using a 2% lump Raney nickel catalyst to produce a product containing 83–85% cis-pinane and 17–15% trans-pinane. Both geometrical isomers were levo-rotatory. The resulting pinane was pyrolyzed by feeding it at the rate of 0.3 grams per minute through a vaporizer maintained at a temperature of 250° C. From the vaporizer the vapors were passed through a 14′17″ long externally heated reactor tube having an internal diameter of ½″. The temperature of the pyrolyzate vapors leaving the reactor tube was 595° C. and the vapors were immediately condensed. The pyrolyzate was analyzed by vapor phase chromatography and found to have the following composition:

| | Percent |
|---|---|
| 2,6-dimethyl-2,7-octadiene (levo-rotatory) | 59.3 |
| pseudocitronellene | 11.1 |
| 1,2 dimethyl-3-isopropenyl cyclopentane | 1.6 |
| cyclic pseudocitronellene | 2.5 |
| trans-pinane | 9.9 |
| cis-pinane | 4.1 |
| cyclic octadiene (1) | 8.2 |
| cyclic octadiene (2) | 3.3 |

From the foregoing it is seen that almost 90% of the cis-pinane was converted, whereas only 73% of the trans-pinane was converted to pyrolysis products and 59.3% of the pinane feed was converted to levo-rotatory 2,6-dimethyl-2,7-octadiene.

When d-pinene containing 99% β-pinene, which consists essentially of 95% dextro-rotatory β-pinene, is hydrogenated at 90° C. and at a pressure of 60 p.s.i.g. using a 2% lump Raney nickel catalyst, a product containing 85% dextro-rotatory cis-pinane and 15% dextro-rotatory trans-pinane is obtained. When such pinane is pyrolyzed in accordance with the procedure of Example 2, a pyrolyzate product containing about 60% dextro-rotatory 2,6-dimethyl-2,7-octadiene is obtained.

EXAMPLE 3

The pyrolyzate of Example 2 was distilled to recover levo-rotatory 2,6-dimethyl-2,7-octadiene and a concentrate containing about 65% trans-pinane. One hundred parts of this concentrate was stirred with 158 parts of formic acid at 45° C. Fourteen parts of 50% $H_2O_2$ was added and the mixture was stirred for 24 hours. The pinane fraction was washed free of acids and the material refractionated to obtain a pinane feed containing 96% trans-pinane. This was further fractionated by vacuum distillation and a fraction which contained 96.3% 1-trans-pinane and 3.7% 1-cis-pinane having the physical characteristics shown below was obtained.

| | |
|---|---|
| $N_D^{20}$ | 1.4608 |
| $N_D^{25}$ | 1.4589 |
| $\alpha_D^{25}$ (10 cm.) | −12.87 |
| $d_4^{25}$ | .8510 |
| $d_4^{55}$ | .8275 |
| $d_4^{15}$ | .8589 |

EXAMPLE 4

The levo-rotatory trans-pinane feed of Example 3 was pyrolyzed in a small laboratory pyrolyzer at a rate of 30 ml. per minute. The temperature measurment inside the pyrolyzer was held constant but was not precisely measured, the concern being to heat the pinane to a suitable temperature for partial pyrolysis at the rate of addition of the pinane employed and maintain it accurately during the run. The pyrolyzate was fractionated into 14 fractions which were chromatographically analyzed. Only four fractions were predominantly 2,6-dimethyl-2,7-octadiene and all the fractions except those rich in unpyrolyzed 1-trans-pinane were dextro-rotatory. The composition of the total pyrolyzate, based on vapor phase chromatographic analysis, had the following composition:

| | Percent |
|---|---|
| d-2,6-dimethyl-2,7-octadiene | 29.3 |
| pseudocitronellene | 23.0 |
| trans-pinane | 27.4 |
| cis-pinane | 1.4 |
| cyclic pseudocitronellene | 7.2 |
| cyclic octadiene (1) | 5.8 |
| cyclic octadiene (2) | 2.3 |

From the foregoing it is seen that the yield of dextro-rotatory 2,6-dimethyl-2,7-octadiene was only 29.3% and that the undesirable side product pseudocitronellene was formed in almost as great an amount as the 2,6-dimethyl-2,7-octadiene. The conversion of trans-pinane to pyrolysis products was 72½% despite the high concentration of trans-pinane present. On the other hand, the cis-pinane which was present in only 3.7% concentration was converted in an amount equivalent to 61% of that originally present in the feed.

EXAMPLE 5

A pinane feed containing 98% 1-cis-pinane and 2% 1-trans-pinane and having an optical rotation $\alpha_D^{25}$−19.75 corresponding to an optical purity of 95% was pyrolyzed in a small laboratory pyrolyzer at the rate of 30 ml. per minute for the same time as the pyrolysis of Example 4. The temperature was maintained at 45° C. below the temperature employed in Example 4 in view of the more rapid rate of pyrolysis of cis-pinane and to minimize the formation of side reaction products. The pyrolyzate was fractionated into 30 fractions and the fractions chromatopographically analyzed. All fractions had a negative (levo-rotatory) optical sign, indicating that they were levo-rotatory, and fractions 2–25 were predominantly levo-rotatory 2,6-dimethyl-2,7-octadiene. The total composition of the pyrolyzate, determined by vapor phase chromatographic analysis, was as follows:

| | Percent |
|---|---|
| 2,6-dimethyl-2,7-octadiene (levo-rotatory) | 69.6 |
| pseudocitronellene | 6.9 |
| cyclic pseudocitronellene | 0.5 |
| 1,2-dimethyl-3-isopropenyl cyclopentane | 0.5 |
| trans-pinane | 0.5 |
| cis-pinane | 9.7 |
| cyclic octadiene (1) | 0.9 |
| cyclic octadiene (2) | 8.8 |

From the foregoing it will be evident that 98% of the cis-pinane in the original feed was pyrolyzed, whereas only 75% of the trans-pinane in the original feed was pyrolyzed. The 69.6% yield of levo-rotatory 2,6-dimethyl-2,7-octadiene of good optical purity is significantly high.

When the process of Example 5 is repeated using a feed containing 98% d-cis-pinane and 2% d-trans-pinane, about 66% of the isomerizate consists of dextro-rotatory 2,6-dimethyl-2,7-octadiene.

EXAMPLE 6

The pinane feed of Example 1 was pyrolyzed under the pyrolysis conditions of Example 4 to obtain a pyrolyzate which contained 64% levo-rotatory 2,6-dimethyl-2,7-octadiene when pyrolyzed to 86% of total pinane conversion. The pyrolyzate also contained 10.5% 1-cis-pinane and 3.5% trans-pinane.

From the foregoing examples it is seen that for highest yields of optically active material a pinene of the highest degree of optical purity should be chosen to form the pinane feed. Further, since cis-pinane of a given optical activity yields more 2,6-dimethyl-2,7-octadiene than does trans-pinane, it is advantageous to use a high cis-pinane to obtain the maximum optical purity.

From the accompanying drawing it is further evident that when pinane feeds of high cis content and high optical activity are employed, the pyrolysis of the pinane feed can be carried to a point more near completion than when feeds containing lesser quantities (e.g. 70%) of cis-pinane are employed.

It will be noted that the pinane feed produced from the pinene in Example 1 contained 95% levo-rotatory cis-pinane and 5% levo-rotatory trans-pinane. From the 2,6-dimethyl-2,7-octadiene produced from this pinane (in Example 6) an l-menthol was synthesized which had an optical purity of 88%, indicating the preservation of optical purity throughout the conversion of pinene, via pinane and 2,6-dimethyl-2,7-octadiene to l-menthol.

When a synthetic pinane feed containing 90% optically pure levo-rotatory cis-pinane and 10% of optically pure dextro-rotatory trans-pinane is pyrolyzed in accordance with the procedure of Example 6 a high yield of levo-rotatory 2,6-dimethyl-2,7-octadiene having 100% levo-rotatory optical purity is obtained.

When a synthetic pinane feed containing 90% dextro-rotatory cis-pinane and 10% levo-rotatory trans-pinane is pyrolyzed in accordance with the procedure of Example 6 optically pure (e.g. 100%) dextro-rotatory 2,6-dimethyl-2,7-octadiene is obtained in high yields.

What is claimed is:

1. In a process for the production of a 2,6-dimethyl-2,7-octadiene isomerizate by the thermal isomerization of a pinane mixture in a pyrolysis zone at a temperature in the range of between 450° to about 650° C., the improvement for making optically active octadienes having an optical sign and purity substantially the same as the optical sign and purity of the original pinane mixture which comprises: (1) passing into said zone an optically active pinane feed in which the optical activity is due to a mixture of cis- and trans-pinane isomers of the same optical rotation, and further in which the proportion of cis-pinane to trans-pinane is between about 75:25 and 95:5; and (2) arresting the pyrolysis of said feed when the fraction of the original pinane pyrolyzed reaches a value within polygon ABCD of the drawing coordinate with the original cis-pinane content of said feed.

2. A process as in claim 1 wherein the pyrolysis is arrested when the fraction of the original pinane pyrolyzed reaches a value within polygon $AB_2C_2D$ of the drawing.

3. A process as in claim 1 wherein the mixture of cis- and trans-pinane isomers have a levo-rotatory optical rotation.

4. A process as in claim 1 wherein the mixture of cis- and trans-pinanes have a dextro-rotatory optical rotation.

5. In a process for the production of a 2,6-dimethyl-2,7-octadiene isomerizate by the thermal isomerization of a pinane mixture in a pyrolysis zone at a temperature in the range of from about 450° C. to about 650° C., the improvement for making levo-rotatory 2,6-dimethyl-2,7-octadiene having an optical purity substantially the same as the optical purity of the original pinane feed mixture which comprises: (1) passing into said zone a levo-rotatory pinane feed mixture in which the levo-rotatory activity is due to a mixture of levo-rotatory cis- and levo-rotatory trans-pinane isomers, and further in which the proportion of cis-pinane to trans-pinane is between about 85:15 and 95:5; (2) arresting the pyrolysis of said feed when the fraction of the original pinane pyrolyzed is between 80% and 90% of the original cis-pinane content of said feed; and (3) withdrawing said isomerizate containing levo-rotatory 2,6-dimethyl-2,7-octadiene having a levo-rotatory optical purity substantially the same as the levo-rotatory optical purity of the original pinane feed from said zone.

6. A process as in claim 5 wherein the pinane feed mixture in a pyrolysis zone is maintained at a temperature of from about 550° to 600° C.

References Cited by the Examiner

UNITED STATES PATENTS

| | | | |
|---|---|---|---|
| 2,388,084 | 10/1945 | Rummelsburg | 260—680 |
| 2,902,495 | 9/1959 | Webb | 260—348 |

DELBERT E. GANTZ, *Primary Examiner.*

G. E. SCHMITKONS, *Assistant Examiner.*